US011959447B2

(12) United States Patent
Husmeier et al.

(10) Patent No.: US 11,959,447 B2
(45) Date of Patent: Apr. 16, 2024

(54) INJECTOR NOZZLE SPRAY HOLE WITH AN AERATED COUNTERBORE

(71) Applicants: Cummins Inc., Columbus, IN (US); Scania CV AB, Sodertalje (SE)

(72) Inventors: Frank Husmeier, Columbus, IN (US); Ross A. Phillips, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/914,181

(22) PCT Filed: Feb. 16, 2021

(86) PCT No.: PCT/US2021/018216
§ 371 (c)(1),
(2) Date: Sep. 23, 2022

(87) PCT Pub. No.: WO2021/202007
PCT Pub. Date: Oct. 7, 2021

(65) Prior Publication Data

US 2023/0349349 A1 Nov. 2, 2023

Related U.S. Application Data

(60) Provisional application No. 63/002,772, filed on Mar. 31, 2020.

(51) Int. Cl.
*F02M 63/00* (2006.01)
*F02M 61/18* (2006.01)

(52) U.S. Cl.
CPC .......... *F02M 63/00* (2013.01); *F02M 61/182* (2013.01)

(58) Field of Classification Search
CPC ............................ F02M 61/182; F02M 63/00
(Continued)

(56) References Cited

U.S. PATENT DOCUMENTS 4,177,948 A 12/1979 Huber
4,566,634 A * 1/1986 Wiegand ................ F02M 57/00 123/585

(Continued)

FOREIGN PATENT DOCUMENTS

GB 2127097 B 5/1986
JP 2004225549 A 8/2004

(Continued)

OTHER PUBLICATIONS

International Search Report and Written Opinion for International patent application No. PCT/US2021/018216, filed Feb. 16, 2021, dated Apr. 21, 2021.

(Continued)

*Primary Examiner* — Hai H Huynh
(74) *Attorney, Agent, or Firm* — Taft Stettinius & Hollister LLP

(57) ABSTRACT

Apparatuses, methods, and systems for fuel injection are disclosed. The apparatus includes an inner sac with at least one spray hole disposed on an inner surface of the apparatus, the at least one spray hole leading to a fuel passage extending therefrom, at least one counterbore extending partially between an outer surface of the apparatus and the sac along the fuel passage, and at least one air entrainment hole extending from the outer surface of the apparatus toward the at least one counterbore, the at least one air entrainment hole fluidly coupled with the at least one counterbore and configured to provide air to the fuel passage.

20 Claims, 5 Drawing Sheets

(58) Field of Classification Search
USPC .............................. 123/467, 531; 239/533.12
See application file for complete search history.

(56) References Cited

U.S. PATENT DOCUMENTS

| | | | | |
|---|---|---|---|---|
| 4,595,144 | A * | 6/1986 | Wiegand .............. | F02M 61/182 239/408 |
| 10,012,196 | B1 * | 7/2018 | Qi ........................ | F02B 23/0648 |
| 10,060,334 | B2 | 8/2018 | Polonowski et al. | |
| 10,161,626 | B2 * | 12/2018 | Mueller ............. | F02M 61/1806 |
| 10,502,171 | B2 * | 12/2019 | Mulye ................ | F02M 61/1813 |
| 11,549,429 | B2 * | 1/2023 | Gubba ................ | F02B 23/0651 |
| 2019/0136745 | A1 * | 5/2019 | Kurtz ..................... | F02M 61/16 |

FOREIGN PATENT DOCUMENTS

| | | | |
|---|---|---|---|
| WO | 2011028283 | A1 | 3/2011 |
| WO | 2014167395 | A1 | 10/2014 |

OTHER PUBLICATIONS

International Preliminary Report on Patentability for International patent application No. PCT/US2021/018216, filed Feb. 16, 2021, dated Aug. 2, 2022.

* cited by examiner

INJECTOR NOZZLE SPRAY HOLE WITH AN AERATED COUNTERBORE

CROSS-REFERENCE TO RELATED APPLICATIONS

This application claims priority to International Patent Application No. PCT/US2021/081216, Feb. 16, 2021, which claims priority to U.S. Provisional Application No. 63/002,772, filed Mar. 31, 2020, the contents of which are incorporated herein by reference in their entirety.

FIELD OF THE DISCLOSURE

The present disclosure relates generally to engine fuel systems, especially to fuel injector configurations used in such engine fuel systems.

BACKGROUND OF THE DISCLOSURE

One of the most important features of an engine fuel system is the atomization of automotive liquid fuels as performed by fuel injectors. The fuel injectors supply fuel via fuel injector tips (some known examples of fuel injector tips include MicroSac tip and VCR tip) to the combustion chamber of an engine, and the combustion occurs when the injected fuel spray mixes with the air within combustible limits. Specifically, air entrainment which mixes air with fuel droplets, vaporization, homogenization, pressure, and heat are involved in aiding the bursting of the fuel droplets in the fuel spray to start the combustion process. The fuel droplet size typically has a Santer Mean Diameter (SDM) of, for example, approximately 10 micron-meters or less. SDM is measured as a 3rd power of volume and 2nd power of surface. The fuel plume has a high kinetic energy, with typical speed within the range of, for example, approximately 300 meters-per-second to approximately 700 meters per second. The fuel plume will typically have an opening angle of approximately 3 degrees to approximately 7 degrees.

FIG. 1 shows one example of a conventional fuel injector component 100. The fuel injector 100 has a sac 102 with nozzle holes or spray holes 104 through which the fuel is injected. The body of the fuel injector 100 has an inner surface or seat 106 which receives a needle component 108, and the needle tip 110 of the needle 108 is inserted into the opening defined by the seat 106 until an edge 112 of the needle 108 comes into contact with the seat 106, thus preventing the needle 108 from progressing further. As the needle 108 is raised by an actuation device, the high pressure fuel is allowed to flow into the sac 102 and out the nozzle holes 104. It would be advantageous to improve the process of mixing of fuel and air, in order to achieve more efficient combustion.

SUMMARY OF THE DISCLOSURE

Various embodiments of the present disclosure relate to apparatuses for fuel injection. The apparatus includes an inner sac with at least one spray hole disposed on an inner surface of the apparatus, the at least one spray hole leading to a fuel passage extending therefrom, at least one counterbore extending partially between an outer surface of the apparatus and the sac along the fuel passage, and at least one air entrainment hole extending from the outer surface of the apparatus toward the at least one counterbore, the at least one air entrainment hole fluidly coupled with the at least one counterbore and configured to provide air to the fuel passage. In one example, the at least one air entrainment hole includes a corner wherein air is at a higher pressure than in the at least one counterbore. In one example, an axis of the at least one counterbore is directed at an angle of between 10 degrees and 50 degrees with respect to a horizontal axis of the apparatus.

In one example, an axis of the at least one air entrainment hole is directed at an angle of between 10 degrees and 90 degrees with respect to the axis of the at least one counterbore. In one example, an axis of the at least one air entrainment hole is directed perpendicularly with respect to the horizontal axis of the apparatus. In one example, the apparatus further includes a plurality of counterbores fluidly coupled with the at least one air entrainment hole through a plurality of air passages. In one example, the at least one air entrainment hole has a cylindrical configuration. In one example, the at least one air entrainment hole has a frustoconical configuration. In one example, the at least one counterbore has a diameter greater than that of the fuel passage. In one example, the at least one counterbore has a cylindrical configuration. In one example, the at least one counterbore has a frustoconical configuration. In one example, a length of the fuel passage is greater than a length of the at least one counterbore. In one example, liquid fuel is configured to contact an inner surface of the counterbore when injected from the fuel passage.

Additional embodiments of the present disclosure relate to methods of fuel injection in an engine. The methods include opening a fuel injecting apparatus in response to an operation signal from an engine control system; inserting fuel through a fuel passage and a counterbore formed in the fuel injection apparatus; redirecting air into the fuel passage through at least one air entrainment hole that is fluidly coupled with the counterbore; and combusting a mixture of air and fuel inside the engine. In one example, redirecting the air into the fuel passage occurs in response to a pressure differential between the at least one air entrainment hole and the a counterbore, wherein the counterbore has a lower pressure than the at least one air entrainment hole.

Furthermore, various embodiments of the present disclosure relate to engine systems that include a plurality of cylinder heads, each cylinder head defining a combustion chamber, a plurality of fuel injectors, each fuel injector coupled with one of the plurality of cylinder heads, and a plurality of pistons, each piston coupled to the combustion chamber of the one of the plurality of cylinder heads. Each injector includes an inner sac with at least one spray hole disposed on an inner surface of the fuel injector, the at least one spray hole leading to a fuel passage extending therefrom; at least one counterbore extending partially between an outer surface of the fuel injector and the sac along the fuel passage; and at least one air entrainment hole extending from the combustion chamber toward the at least one counterbore, the at least one air entrainment hole fluidly coupled with the at least one counterbore and configured to provide air to the fuel passage.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

Figure 1:
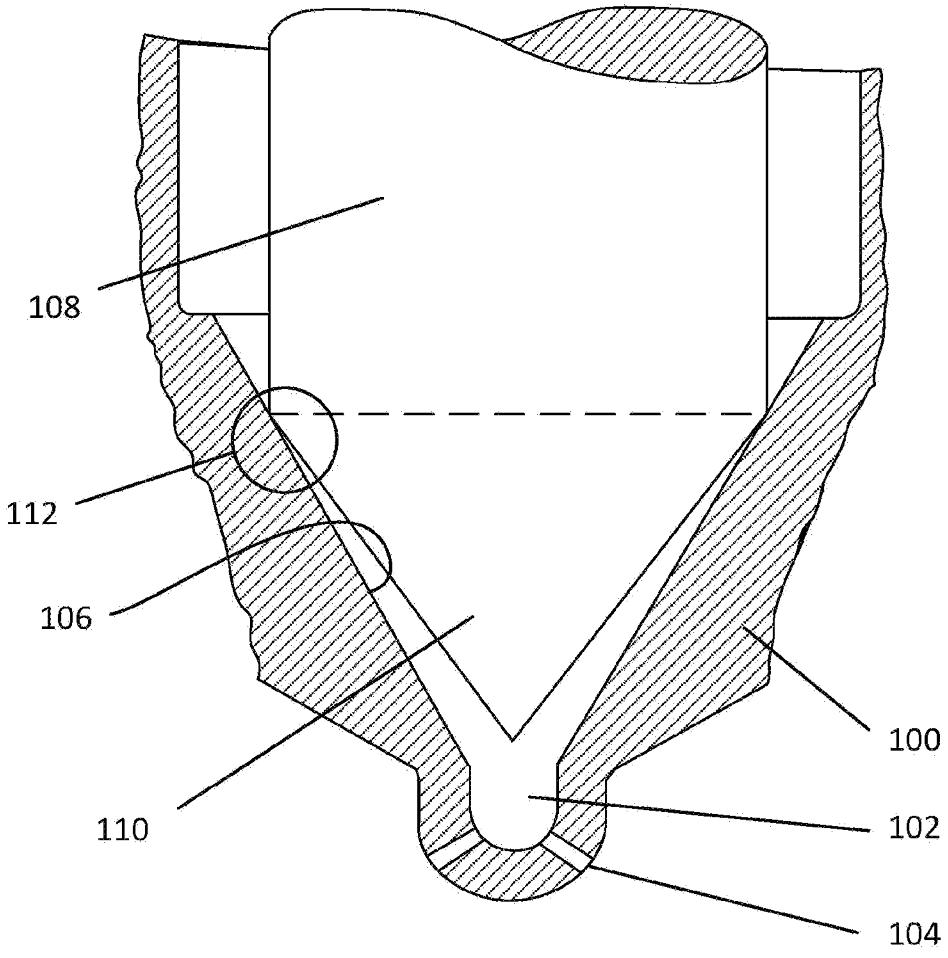
FIG. 1 (Prior art)
FIG. 1 a partial cross-sectional view of a prior-art example of a fuel injector as known in the art.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Figure 2:
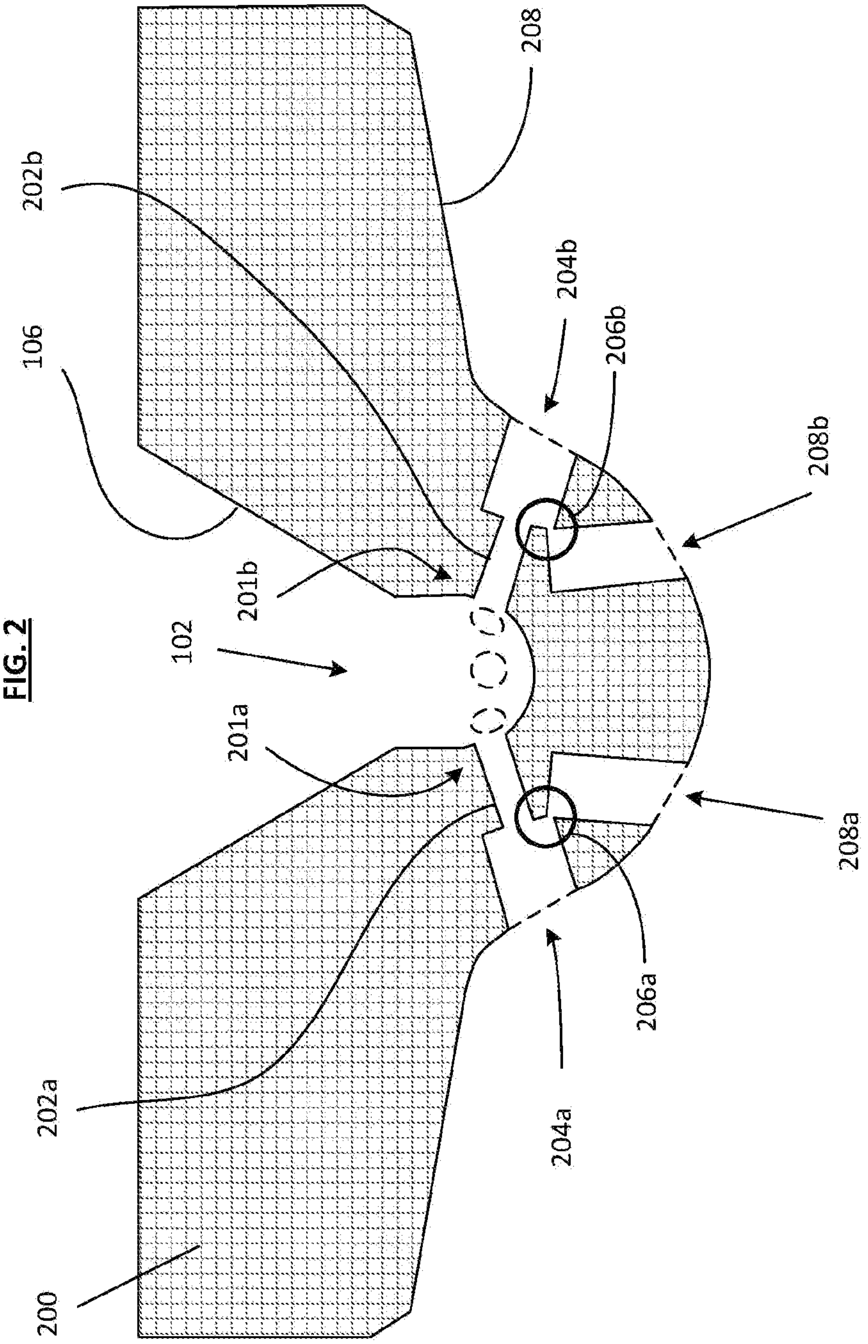
FIG. 2 is a partial cross-sectional view of an example of a fuel injector as disclosed herein according to an embodiment.

FIG. 2 shows a partial cross-sectional view of an apparatus 200 which may be a fuel injector component, for example, and includes a plurality of spray holes **201*a*, 201*b* extending from the sac 102 to form passages 202*a*, 202*b*. Although only two spray holes are shown, the sac 102 may have any number of spray holes extending therefrom. There are also a plurality of counterbores 204*a*, 204*b* extending from the passage to an outer surface 208 of the apparatus 200. The counterbores 204*a*, 204*b* extend partially between the inner seat 106 and the outer surface 208. In some examples, the length between the inner seat 106 and the counterbore 204*a* or 204*b* is greater than the length of the counterbore 204*a* or 204*b* to improve the consistency of the fuel droplet size as the fuel is sprayed from within the sac 102. In some examples, the length of the counterbore 204*a* or 204*b* is greater than the length between the inner seat 106 and the counterbore 204*a* or 204*b* to improve targeting accuracy of the fuel spray. In some examples, the counterbores 204*a*, 204*b* have greater diameters than those of the passages 202*a*, 202*b***.

At least one of the counterbores **204*a*, 204*b* is connected to at least one neighboring air entrainment hole 208*a* or 208*b* via an air passage 206*a* or 206*b*. The air passages 206*a*, 206*b* function as a passageway for air to pass from external atmosphere into the counterbores 204*a*, 204*b*. Typically, the apparatus 200 is fluidly connected to a combustion chamber of an engine, and in such instances, the combustion chamber of the cylinder also has a plethora of unused oxygen which can be sucked back into the fuel passage (for example, the passage 202*a* or 202*b***) to be inserted again into the combustion chamber, but this time with fuel sprayed into it simultaneously (in the case of "direct injection" implementation in which the injectors are mounted in the cylinder head and the injectors spray fuel directly into the engine cylinder). The injection of air together with the fuel increases the efficiency of the engine because the added air allows for the fuel to burn completely. In some examples, "port injection" may also be implemented in which the fuel is sprayed into the intake ports where the fuel mixes with the incoming air.

In some examples, the counterbores **204*a*, 204*b* as well as the air entrainment holes 208*a*, 208*b* are formed using a drill to drill a cylindrical opening, whereas in other examples, different methods may be employed to form these holes. For example, an electrical discharge machining (EDM) method may be employed, as disclosed in U.S. Publication No. 2018/0311753 assigned to Cummins Inc., which is a process by which conductive particles are removed from the surface of a positively charged workpiece by a series of discharges emanating from a negatively charged electrode. The electrical discharges or sparks create micro-craters on the workpiece by removing material along the cutting path through melting and vaporization. Other suitable methods, such as laser drilling, may also be employed. It should be understood that, although the above example mentions cylindrical openings, the counterbores 204*a*, 204*b* and the air entrainment holes 208*a*, 208*b*** may be of any suitable shape and size, such as polygonal, ovular, paraboloid, tapered, conical, frustoconical, etc.

In some configurations of the air entrainment holes 208*a*, 208*b* as explained above, there may be one or more corners within the air entrainment holes 208*a*, 208*b* that have higher pressure as compared to the counterbores 204*a*, 204*b*. In such examples, the air passage 206*a*, 206*b* fluidly coupling the air entrainment holes 208*a*, 208*b* with the counterbores 204*a*, 204*b* may be located at or proximate to such low-pressure corners of the counterbores 204*a*, 204*b*. During fuel injection, the fuel is being injected from the sac 102 at high pressure causing the fuel to be injected at a high velocity, for example from 200 m/s to 300 m/s, 300 m/s to 400 m/s, 400 m/s to 500 m/s, 500 m/s to 600 m/s, or greater than 600 m/s, as needed. The pressure differential formed between the low-pressure counterbores 204*a*, 204*b* and the high-pressure air entrainment holes 208*a*, 208*b* causes air to be pulled through the high-pressure air entrainment holes 208*a*, 208*b* into the low-pressure counterbores 204*a*, 204*b* through the air passage 206*a*, 206*b*. The air passage 206*a*, 206*b* may have any suitable flow area. In some examples, the air passage 206*a*, 206*b* is approximately the size of the fuel passage 202*a*, 202*b* or smaller, with one dimension of the flow area ranging approximately from 50 μm to 150 μm, 150 μm to 200 μm, 200 μm to 250 μm, 250 μm to 300 μm, 300 μm to 350 μm, or 350 μm to 400 μm. The air entrainment hole 208*a*, 208*b* may have similar or greater flow area as compared to the fuel passage 202*a*, 202*b*. For example, the air entrainment hole 208*a*, 208*b* may have one dimension of the flow area ranging approximately from 100 μm to 200 μm, 200 μm to 300 μm, 300 μm to 400 μm, 400 μm to 500 μm, 500 μm to 600 μm, 600 μm to 700 μm, 700 μm to 800 μm, 800 μm to 900 μm, 900 μm to 1 mm, or greater than 1 mm.

Figure 3:
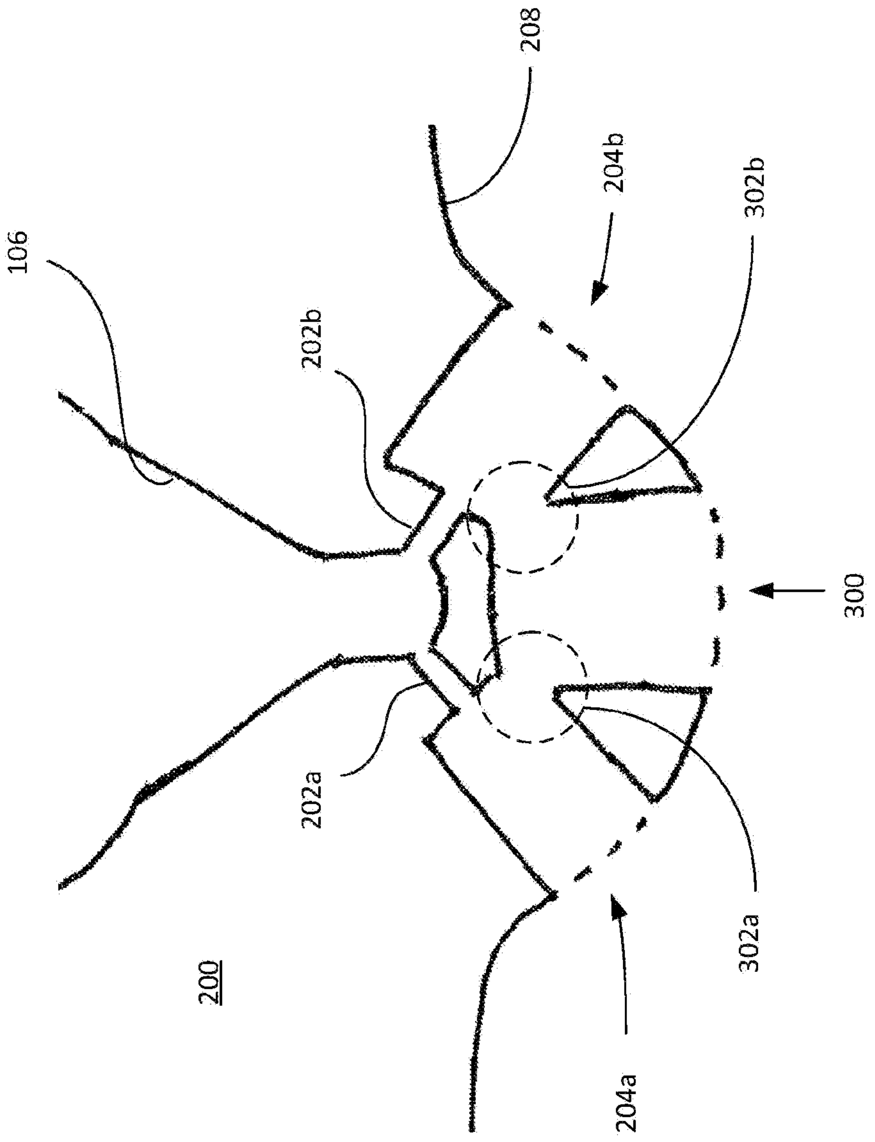
FIG. 3 is a partial cross-sectional view of an example of a fuel injector as disclosed herein according to an embodiment.

FIG. 3 shows a partial cross-sectional view of another example of the apparatus 200 according to an embodiment as disclosed herein, which may be a fuel injector component, for example. The example shown in the figure includes an intermediate air entrainment hole 300 disposed between and connected to the two neighboring counterbores 204*a*, 204*b*. Air passages 302*a*, 302*b* are connected such that the intermediate air entrainment hole 300 and the neighboring counterbores 204*a*, 204*b* are fluidly coupled together, and air flow is permitted therebetween. In this embodiment, the intermediate air entrainment hole 300 has a flow area that is sufficient to connect the two counterbores 204*a* and 204*b*. As such, the intermediate air entrainment hole 300 may have a flow area greater than those of the air entrainment holes 208*a* and 208*b* shown in FIG. 2.

Figure 4:
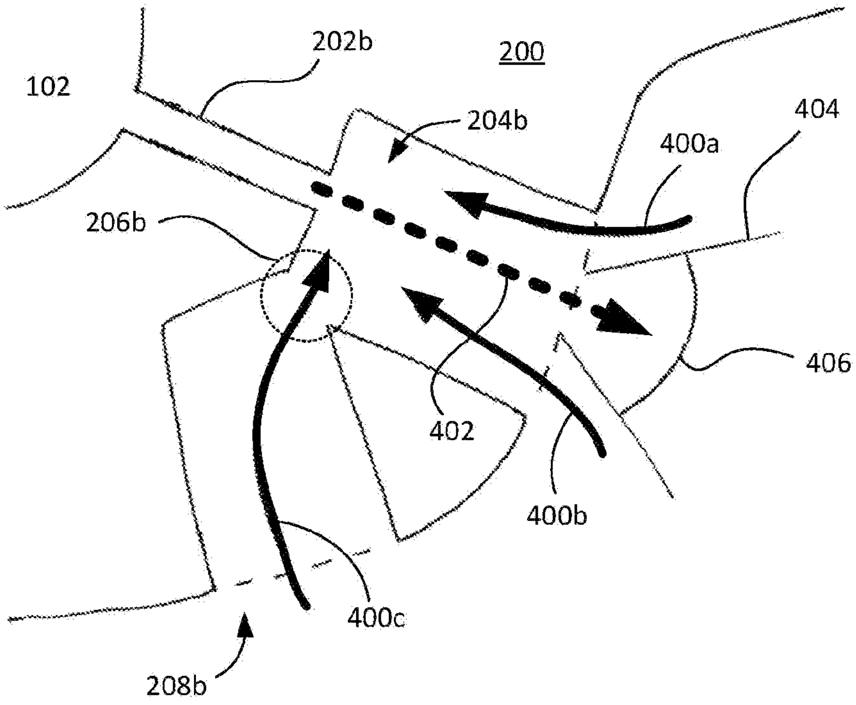
FIG. 4 is a partial cross-sectional view of an example of a fuel injector as disclosed herein according to an embodiment.

FIG. 4 shows a partial cross-sectional view of a portion of the apparatus 200 as shown in FIG. 2 which illustrates how air flows into the apparatus 200. Specifically, air flows via air paths 400*a*, 400*b*, 400*c* from an external atmosphere into the counterbore 204*b* such that the air path 400*c* enters through the air entrainment hole 208*b* and passes through the air passage 206*b* to enter the counterbore 204*b*, while the other air paths 400*a*, 400*b* directly enter the counterbore 204*b*. Also shown are a fuel injection path 402, a fuel plume 404, and a fuel plume angle 406. The fuel injection path 402 is the path taken by the fuel as it is injected from the sac 102, and the fuel plume 404 is the fuel as it is being sprayed from the counterbore 204*b*. The fuel plume angle 406 is the angle at which the fuel plume 404 will be sprayed. In some examples, most if not all of the air that enters the fuel passage (for example, the passage 202*a* or 202*b*) enters through the air path 400*c*, with little to no air entering through the air paths 400*a* and 400*b*.

Figure 5:
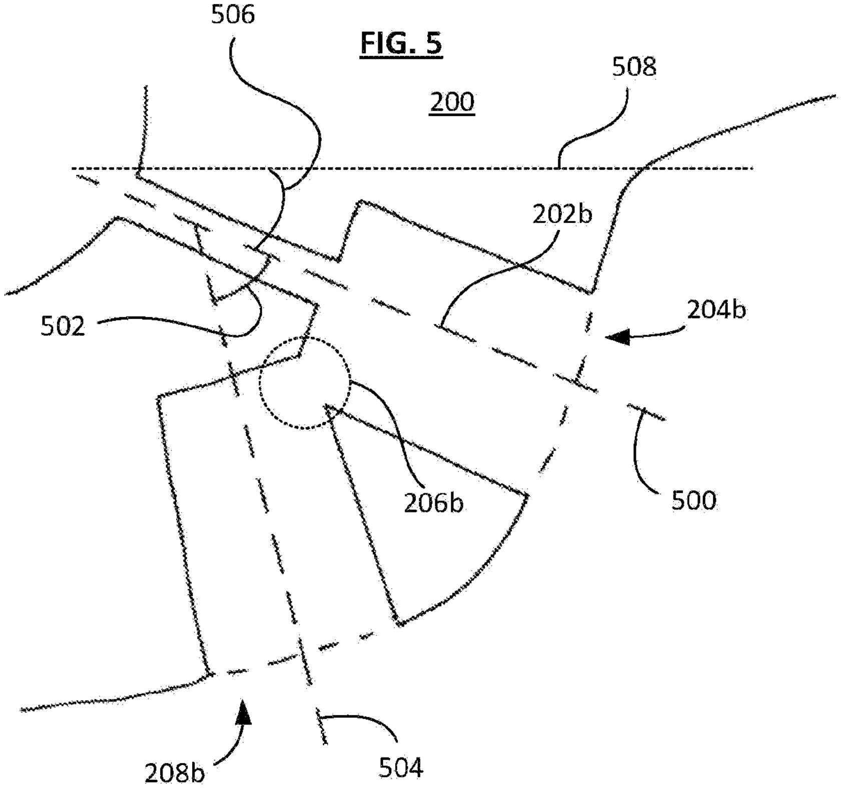
FIG. 5 is a partial cross-sectional view of an example of a fuel injector as disclosed herein according to an embodiment.

FIG. 5 shows the partial cross-sectional view of a portion of the apparatus 200 as shown in FIG. 4, further illustrating a longitudinal axis 500 of the counterbore 204*b* and another longitudinal axis 504 of the air entrainment hole 208*b*, and an angle 502 formed therebetween. In one example, the angle 502 is between about 20° and about 30°, 30° and about 40°, about 40° and about 50°, about 50° and about 60°, about 60° and about 70°, about 70° and about 80°, about 80° and about 90°, or any combination thereof. Also, the longitudinal axis 500 may be directed at an angle 506 of between about 10° and about 20°, about 20° and about 30°, 30° and about 40°, about 40° and about 50°, about 50° and about 60°, about 60° and about 70°, or any combination thereof, with respect to a horizontal axis 508 of the apparatus 200. In some embodiments, the longitudinal axis 504 of the air entrainment hole 208*b* may be substantially perpendicular with respect to the horizontal axis 508, as shown in FIG. 2, for example.

Figure 6:
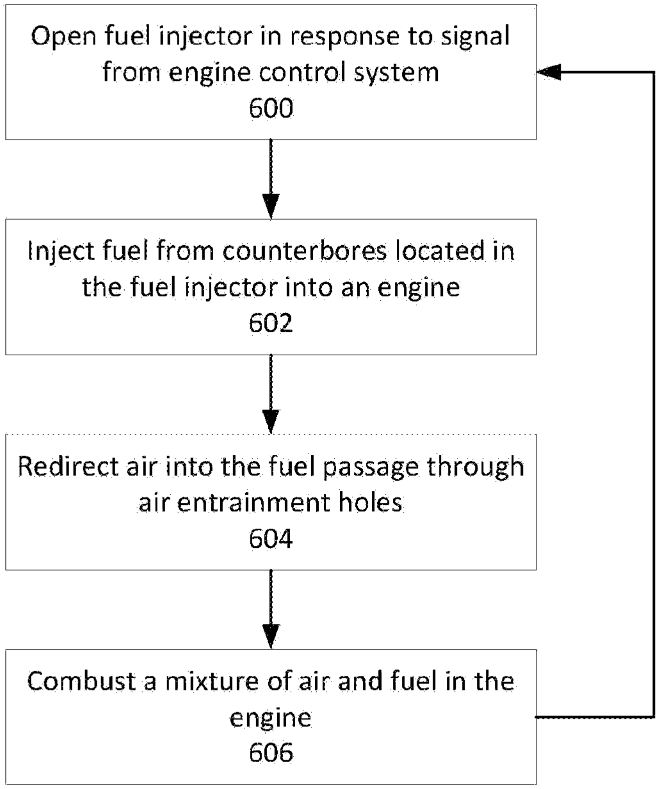
FIG. 6 is a flow diagram of a method of operating a fuel injector as disclosed herein according to an embodiment.

FIG. 6 shows a flow chart describing a method of fuel injection using the apparatus 200 as described herein, where the apparatus 200 is a fuel injector. In block 600, an engine control system functionally coupled to the fuel injector signals the fuel injector to open. In block 602, the fuel is injected or sprayed from counterbores located in the fuel injector into an engine, which may be an internal combustion engine. In block 604, while injecting fuel through the fuel passage, air is injected through one or more air entrainment holes that is in fluid connection with the counterbore and subsequently introduced into the fuel passage. The redirecting of the air into the air entrainment holes is due to the pressure differential between the air entrainment holes and the counterbores as previously explained. Thereafter, in block 606, fuel and air inside the engine are mixed together and combustion occurs to move a plurality of pistons within the engine. In a gasoline engine, such combustion occurs as a result of the fuel mixing with the air, compressed by pistons, and ignited by sparks from sparkplugs. In a diesel engine, the air is first compressed, and the fuel is subsequently injected, which directly causes ignition because the air is heated up when compressed. Thereafter, the process proceeds back to block 600. This process continues for as long as necessary as determined by the engine control system.

It is to be understood that the apparatus 200 as mentioned herein may be used as a fuel injector in an engine system, which include a plurality of cylinder heads, a plurality of fuel injectors, and a plurality of pistons, among other components typically found in an engine system. The cylinder head defines a combustion chamber in which combustion of the fuel-and-air mixture takes place, and each fuel injector is coupled with one of the cylinder heads such that the fuel injector is in fluid communication with the combustion chamber. Also, each piston is located or coupled with a combustion chamber such that the combustion within the chamber propels the piston. In one embodiment, each fuel injector has an inner sac with at least one spray hole disposed on an inner surface of the fuel injector. Each spray hole leads to a fuel passage extending therefrom. The fuel injector also includes at least one counterbore extending partially between an outer surface of the fuel injector and the sac along the fuel passage. Furthermore, the fuel injector includes at least one air entrainment hole extending from the combustion chamber toward the counterbore such that each air entrainment hole is fluidly coupled with one or more counterbores. Each air entrainment hole provides air to the fuel passage in forming a fuel-and-air mixture which is used to cause the combustion inside the combustion chamber.

Advantages in having the air entrainment holes 208*a*, 208*b*, or 300 as disclosed herein include increased fuel and air mixing within the combustion chamber and improved combustion efficiency. Additionally, it can potentially help reduce aftertreatment complexity for heavy duty and large engine frames because of the increased combustion efficiency. For example, in some cases, the rail pressure in a high-pressure injection system can be lowered to reduce parasitic losses which are caused by many of the auxiliary components within the engine such as the oil pump, water pump, fuel pump, and air compressor, among others, as well as friction, lash, and other losses occurring in the drivetrain. Reducing the fuel pressure can reduce some of the parasitic losses, but at the same time causes the problem of poorer spray atomization. For example, on the initial injection of fuel into an air-filled intake manifold of the engine, there may be a possibility that the fuel that is being sprayed into the engine does not have a droplet size that is sufficiently small. Smaller droplets vaporize more quickly than larger ones, so they generally enable a more rapid and efficient combustion. Because of the reduction in combustion efficiency may outweigh the amount of parasitic losses that is also being reduced, injecting air back into the fuel injector can provide considerable advantages, since mixing the air into the fuel stream when the fuel is injected from the fuel injector can enhance the spray atomization, thereby creating a finer spray of fuel with smaller droplet size and enabling the reduction to the parasitic losses while maintaining lower fuel pressures.

Furthermore, during the combustion cycle, some of the charge air is not completely used up after the fuel and air mixture is combusted to move the cylinders. As such, the unused air is oftentimes stagnant in the center of the combustion chamber as secondary air flows, such as swirls and tumbles, which decay quickly during the combustion process. Thus, positioning the inlet of air entrainment holes in the vicinity of the center of the combustion chamber can help utilize the unused air, leading to a more complete usage of the charge air, thus potentially reducing the amount of unburned hydrocarbon in the system, and resulting in less hydrocarbon to be burned (oxidized) in the diesel oxidation catalyst (DOC) within the exhaust aftertreatment system of the diesel engine, for example. Additionally, during the combustion process, temperature of the air injected through the air entrainment holes steadily increases, resulting in a higher temperature at the tail of the spray plumes. This can aid in reducing soot formations within the engine system without significantly impacting the NOx formation as the flame front temperatures are mainly unaffected.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible. The above detailed description and the examples described therein have been presented for the purposes of illustration and description only and not for limitation. For example, the operations described can be done in any suitable manner. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. An apparatus for fuel injection, comprising:

an inner sac with at least one spray hole disposed on an inner surface of the apparatus, the at least one spray hole leading to a fuel passage longitudinally extending therefrom toward an outer surface of the apparatus;

at least one counterbore extending partially between the outer surface of the apparatus and the sac and fluidly coupled with the sac via the fuel passage;

at least one air entrainment hole extending from the outer surface of the apparatus toward the fuel passage; and at least one air passage with a first end and a second end, the at least one air passage fluidly coupling the at least one counterbore and the at least one air entrainment hole, wherein the at least one air passage extends from the first end at a corner of the at least one air entrainment hole where there is high pressure to the second end at a corner of the at least one counter bore where there is low pressure so that air is pulled through the at least one entrainment hole into the at least one counterbore.

2. The apparatus of claim 1, wherein the corner of the at least one air entrainment hole is fluidly coupled with at least two neighboring counterbores.

3. The apparatus of claim 1, wherein an axis of the at least one counterbore is directed at an angle of between 10 degrees and 50 degrees with respect to a horizontal axis of the apparatus.

4. The apparatus of claim 3, wherein an axis of the at least one air entrainment hole is directed at an angle of between 10 degrees and 90 degrees with respect to the axis of the at least one counterbore.

5. The apparatus of claim 3, wherein an axis of the at least one air entrainment hole is directed perpendicularly with respect to the horizontal axis of the apparatus.

6. The apparatus of claim 1, further comprising a plurality of counterbores fluidly coupled with the at least one air entrainment hole through a plurality of air passages.

7. The apparatus of claim 1, wherein the at least one air entrainment hole has a cylindrical configuration.

8. The apparatus of claim 1, wherein the at least one air entrainment hole has a frustoconical configuration.

9. The apparatus of claim 1, wherein the at least one counterbore has a diameter greater than that of the fuel passage.

10. The apparatus of claim 1, wherein the at least one counterbore has a cylindrical configuration.

11. The apparatus of claim 1, wherein the at least one counterbore has a frustoconical configuration.

12. The apparatus of claim 1, wherein a length of the fuel passage is greater than a length of the at least one counterbore.

13. The apparatus of claim 1, wherein liquid fuel is configured to contact an inner surface of the counterbore when injected from the fuel passage.

14. An engine system comprising:

a plurality of cylinder heads, each cylinder head defining a combustion chamber;

a plurality of the apparatuses for fuel injection according to claim 1, each coupled with one of the plurality of cylinder heads; and a plurality of pistons, each piston coupled to the combustion chamber of the one of the plurality of cylinder heads.

15. A method of fuel injection in an engine, comprising:

opening a fuel injecting apparatus in response to an operation signal from an engine control system;

inserting fuel through a fuel passage and a counterbore formed in the fuel injection apparatus;

redirecting air into the fuel passage through an air passage fluidly coupling the counterbore and at least one air entrainment hole and extending from a corner of the at least one air entrainment hole where there is high pressure to a corner of the counterbore where there is low pressure such that the air is pulled through the at least one entrainment hole in to the counterbore; and combusting a mixture of air and fuel inside the engine.

16. The method of claim 15, wherein redirecting the air into the fuel passage occurs in response to a pressure differential between the at least one air entrainment hole and the counterbore, wherein the counterbore has a lower pressure than the at least one air entrainment hole.

17. A method of manufacturing an apparatus having an inner sac for fuel supply and injection, comprising:

forming at least one spray hole disposed on an inner surface of the apparatus and coupled with the inner sac;

forming at least one counterbore extending partially between an outer surface of the apparatus and the sac and fluidly coupled with the sac via a fuel passage;

forming at least one air entrainment hole extending from the outer surface of the apparatus toward the fuel passage; and forming at least one air passage with a first end and a second end, the at least one air passage fluidly coupling the at least one counterbore and the at least one air entrainment hole, wherein the at least one air passage extends from the first end at a corner of the at least one air entrainment hole where there is high pressure to the second end at a corner of the at least one counter bore where there is low pressure so that air is pulled through the at least one entrainment hole into the at least one counterbore.

18. The method of claim 17, further comprising:

forming a plurality of counterbores extending partially between the outer surface of the apparatus and the sac along the fuel passage such that the counterbores are fluidly coupled with the at least one air entrainment hole through a plurality of air passages.

19. The method of claim 17, further comprising:

forming the at least one air entrainment hole extending from the outer surface of the apparatus toward at least two neighboring counterbores such that the corner of the at least one air entrainment hole is fluidly coupled with the at least two neighboring counterbores.

20. The method of claim 17, wherein the at least one counterbore and the at least one air entrainment hole are formed using a drill, an electrical discharge machine, or laser drilling.

* * * * *